DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 9

T939,007
METHANE COOLED DESALINATION METHOD AND APPARATUS

Joseph Seliber, Wilmette, Ill., assignor to Pacific Lighting Service Co., Los Angeles, Calif.

Continuation of abandoned application Ser. No. 154,131, June 17, 1971. This application Nov. 13, 1973, Ser. No. 415,431

Int. Cl. E01d *9/04*
U.S. Cl. 62—58
2 Sheets Drawing. 10 Pages Specification

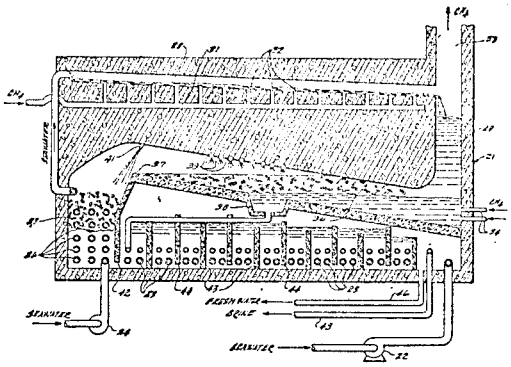

Figure 1:
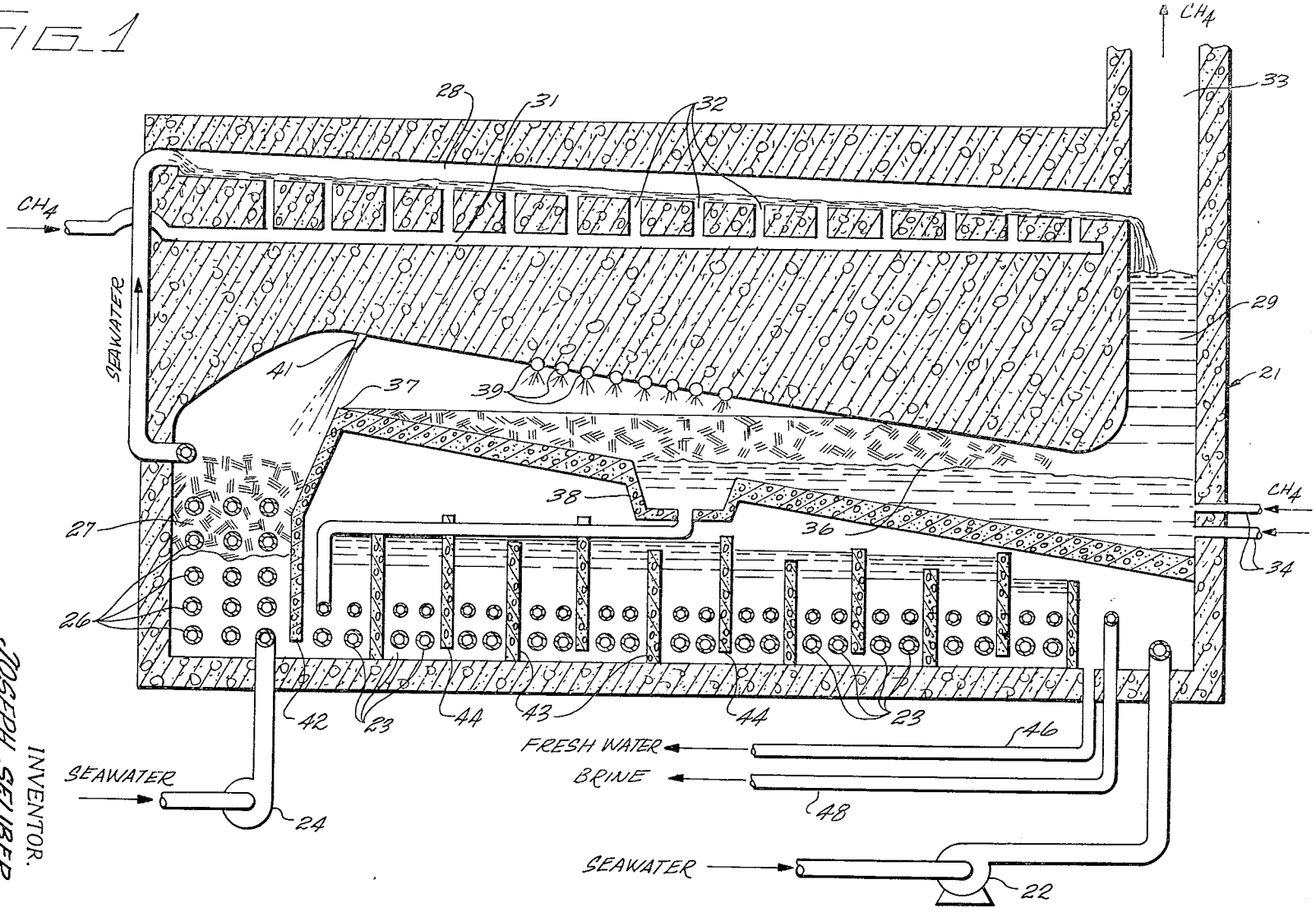
Figure 2:
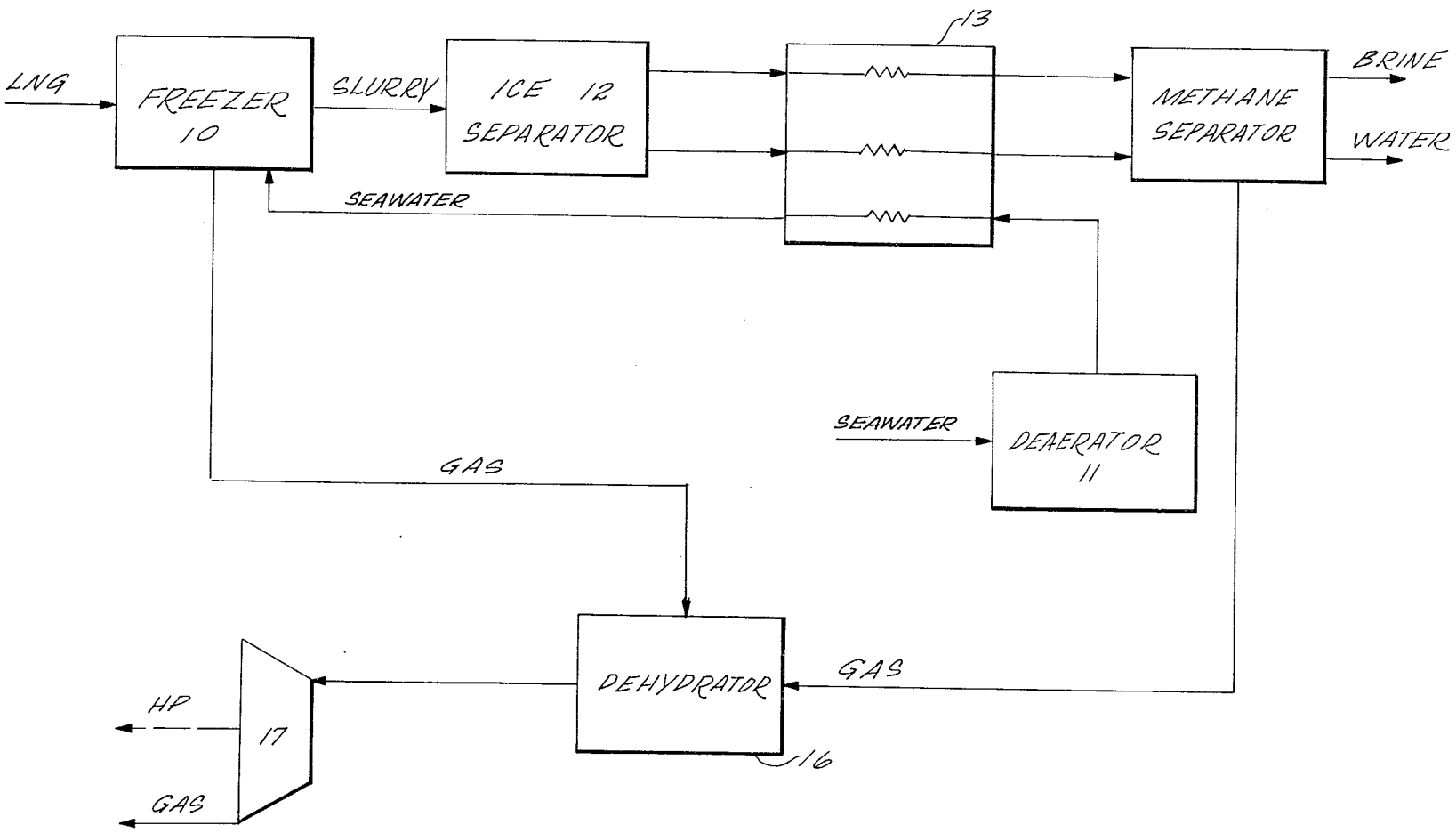

A unitary apparatus is provided within which several functions of an integrated desalination system are performed. Desalination is effected by freezing ice in saline water by direct sparging through 32 of cold natural gas into the saline water in an upper sluice 28 and in the lower portion of a substantially vertical standpipe 29. The slurry of ice and brine drops from the sluice 28 into the top of the vertical standpipe 29 through which it flows downwardly, and then laterally upwardly in a separation section 36 having means 38 for draining brine from the bottom portion and for removing ice from the top portion. Incoming saline water flows countercurrent in 23 and 26 to fresh water 46 and brine 48 and melts the ice for precooling prior to contact with the natural gas. Within the unitary apparatus of FIG. 1, ice, brine, fresh water, and gas, flow under the influence of gravity, thereby minimizing internal mechanisms. In FIG. 2, after dewatering, the natural gas is expanded through a turbine 17 for producing shaft horsepower useful for pumping seawater and generating electricity.

METHANE COOLED DESALINATION
METHOD AND APPARATUS

Original Filed Nov. 13, 1973

INVENTOR.
JOSEPH SELIBER
BY
Christie, Parker & Hale
ATTORNEYS